US007912820B2

(12) United States Patent
Garden et al.

(10) Patent No.: US 7,912,820 B2
(45) Date of Patent: Mar. 22, 2011

(54) AUTOMATIC TASK GENERATOR METHOD AND SYSTEM

(75) Inventors: Euan Garden, Bellevue, WA (US); Robert Walters, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 10/456,904

(22) Filed: Jun. 6, 2003

(65) Prior Publication Data

US 2004/0249856 A1 Dec. 9, 2004

(51) Int. Cl.
*G06F 17/00* (2006.01)

(52) U.S. Cl. .......................................... 707/702; 718/100

(58) Field of Classification Search .................. 707/609, 707/665, 702, 999.2, 694; 719/318; 718/100
See application file for complete search history.

(56) References Cited

U.S. PATENT DOCUMENTS

| | | | | |
|---|---|---|---|---|
| 4,939,689 A * | 7/1990 | Davis et al. ............................ 1/1 |
| 5,394,549 A * | 2/1995 | Stringfellow et al. ......... 718/100 |
| 5,655,081 A | 8/1997 | Bonnell et al. ............ 395/200.32 |
| 6,047,046 A * | 4/2000 | Smets et al. ................ 379/88.25 |
| 6,347,374 B1 | 2/2002 | Drake et al. ................... 713/200 |
| 6,405,212 B1* | 6/2002 | Samu et al. ................ 707/103 R |
| 6,427,146 B1 | 7/2002 | Chu .................................... 707/3 |
| 6,745,174 B2* | 6/2004 | Levy et al. ..................... 707/702 |
| 6,757,902 B2* | 6/2004 | Katz et al. ...................... 719/318 |
| 6,820,080 B2* | 11/2004 | Anderson et al. ............. 707/702 |
| 7,113,989 B2* | 9/2006 | Murray et al. ................. 709/224 |
| 7,234,142 B1* | 6/2007 | Uchibori ........................ 718/102 |
| 7,617,240 B2* | 11/2009 | Guyan et al. ................ 707/104.1 |
| 2002/0078257 A1* | 6/2002 | Nishimura ..................... 709/318 |
| 2002/0091672 A1 | 7/2002 | Vos et al. ............................ 707/1 |
| 2002/0107905 A1* | 8/2002 | Roe et al. ....................... 709/202 |
| 2002/0184349 A1* | 12/2002 | Manukyan .................... 709/221 |
| 2003/0097457 A1* | 5/2003 | Saran et al. .................... 709/230 |
| 2003/0110253 A1* | 6/2003 | Anuszczyk et al. .......... 709/224 |

(Continued)

FOREIGN PATENT DOCUMENTS

JP 2003-022250 1/2003

OTHER PUBLICATIONS

Van Tassel, J.P. et al., "Specifying and Automatically Generating Ada Tasks in Prolog", *ACM Annual Computer Science Conference, Proceedings of the 1990 ACM Annual Conference on Cooperation*, 1990, 121-127.

(Continued)

*Primary Examiner* — Robert Timblin
(74) *Attorney, Agent, or Firm* — Woodcock Washburn LLP (57) ABSTRACT

An automatic task generation mechanism provides generation of tasks such as maintenance tasks for a computer system. A set of tasks is set up along with rules for performing the tasks. The rules may be associated with metadata that allow the tasks to be mapped to the tasks. Events may be detected that are related to database operations such as a create, modify, delete or add command. Upon event detection by the system, the system may store the event and associated metadata. Another process may query the event and metadata storage and compare those items to the rules previously set up. If there is a match between the rules and the event, one or more tasks may be established which correspond to an action that is desired to be taken. The task may then be inserted into a computer system for subsequent execution.

20 Claims, 4 Drawing Sheets

U.S. PATENT DOCUMENTS

| | | | |
|---|---|---|---|
| 2003/0225883 A1* | 12/2003 | Greaves et al. | 709/224 |
| 2004/0006550 A1* | 1/2004 | Upton | 707/1 |
| 2004/0028069 A1* | 2/2004 | Tindal et al. | 370/429 |
| 2004/0049481 A1* | 3/2004 | Blevins | 707/1 |
| 2004/0078802 A1* | 4/2004 | Hammer et al. | 719/318 |
| 2004/0216098 A1* | 10/2004 | Roe et al. | 717/161 |

OTHER PUBLICATIONS

TIBCO Educational Services, "TIB523 TIBCO Hawk 4.x Administration and Configuration", Student Workbook, May 31, 2002, 13-52, 249-283, XP-002358779.

TIBCO Educational Services, "TIB306 TIBCO Adapter for ActiveDatabase 4.2.x Concepts & Configuration", Student Workbook, Nov. 8, 2002, 13-31, XP-002358778.

* cited by examiner

AUTOMATIC TASK GENERATOR METHOD AND SYSTEM

FIELD OF THE INVENTION

The invention relates generally to the field of computer databases and more specifically to the field of automatic task generation for objects in database management systems.

BACKGROUND OF THE INVENTION

Computer system administrators are under constant pressure to perform a variety of tasks within a short amount of time. These tasks include everything from routine maintenance tasks such as performing a database backup, to more critical issues such as hardware failure. There are some events requiring subsequent system maintenance, such as the creation of a new database by a user that may go unnoticed by a system administrator. Therefore some maintenance tasks such as a backup of a newly created file may not be immediately recognized for the maintenance tasks it may require. In addition, each system environment and installation into an enterprise environment directs a unique set of rules for performing maintenance tasks. But since such maintenance efforts are unique, system administrators often spend time and energy resources generating their own tailored set of maintenance tasks based on the rules or policy of the computing environment and utilization.

Thus, there is a need for a way to automatically invoke tasks concerning automatic maintenance tasks and other related functions on a computer system. It would be useful if such automatic tasks were to utilize metadata as well as event data to trigger the development and deployment of such tasks. The invention addresses the aforementioned needs and solves them with various systems, methods and techniques to generate tasks that can act within a computer system. The invention is valid for all automatic task generation functions and, for example, may be embodied in the form of an auto task enlistment function applicable to database management.

SUMMARY OF THE INVENTION

The invention includes an automatic task generation mechanism to generate tasks such as maintenance tasks for a computer system. The invention includes the setup of a set of tasks and rules for performing the tasks. The rules may be associated with metadata that allow the tasks to be mapped to the rules. When an event is detected by the system, the system may store the event and the associated metadata. Another string may query the event and metadata storage and compare those items to the rules previously set up. If there is a match between the rules and the event, one or more tasks may be established which correspond to an action that is desired to be taken.

For example, if a database is created, an event is triggered along with metadata and is compared to a set of rules, should the rules indicate that the event is one which should be subsequently backed up for maintenance purposes, then a series of commands is generated to implement the rule.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The invention involves a task generator which may operate automatically to generate commands to a computer system, specifically to a database management system. The automatic task generator receives an indication that a database-related operation has occurred. The invention compares the database operation and related metadata with a set of stored rules to determine if an automatic task need be generated. If an automatic task is desired, it may be formed from stored tasks relating to the rules which correspond to the database operation which was originally detected. Such tasks are generally object related and corresponding object metadata may be used in the task comparison and generation steps.

This invention may be resident as part of one or more computer systems or components. As such, a description of an exemplary computer device and its environment is provided hereinbelow.

Exemplary Computing Device

Figure 1:
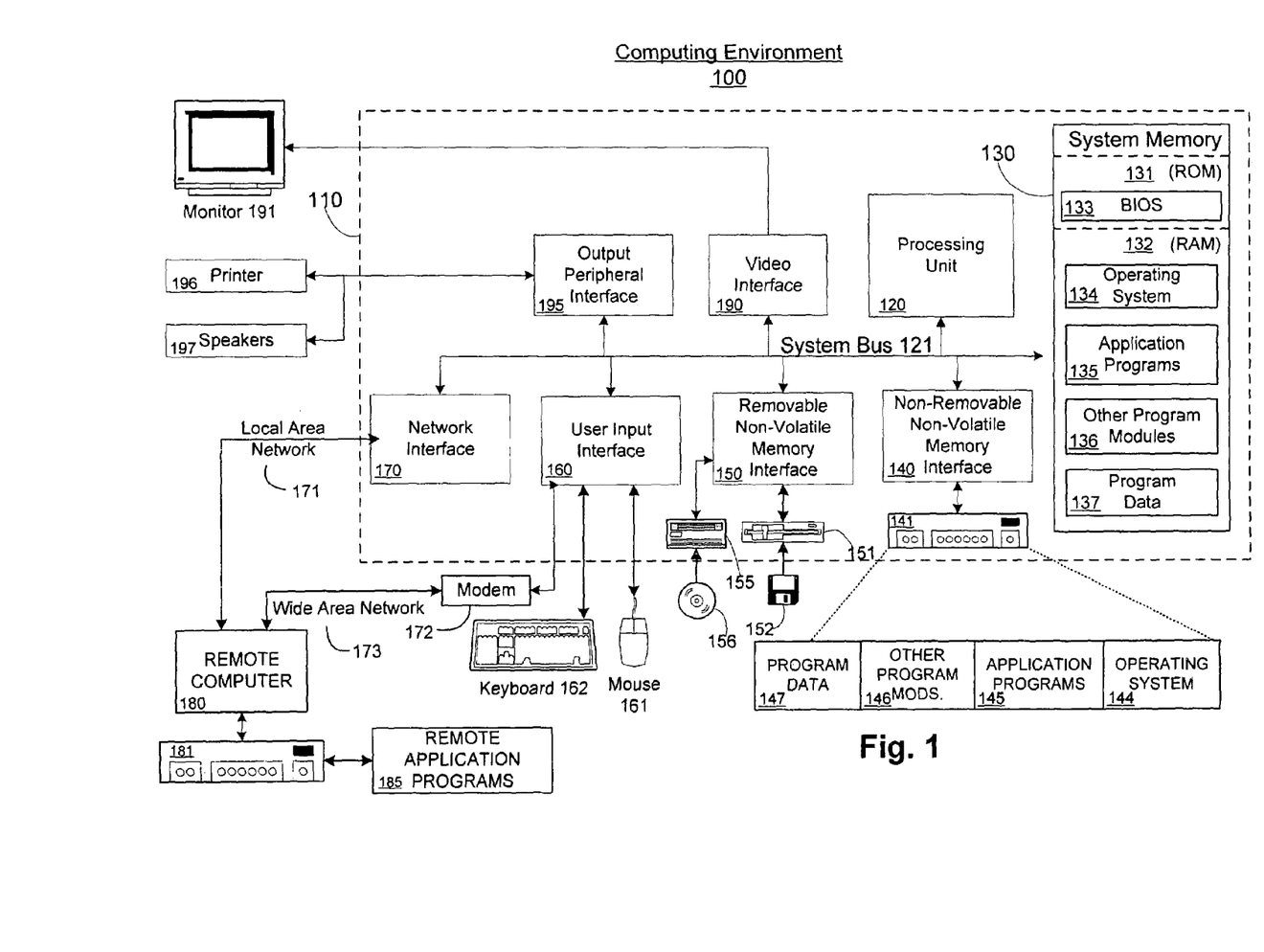
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the invention. Thus, while a general purpose computer is described below, this is but one example, and the invention may be implemented with other computing devices, such as a client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, One Microsoft Way, Redmond, Wash. 98052, includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

Exemplary Embodiments of the Invention

The invention provides automatic task enlistment systems and methods that alleviate some of the burden on administrators by performing intelligent routine maintenance tasks based on user-defined policies or rules and object meta-data. The ability to automatically enlist an object into a routine maintenance task based on a set of rules would allow administrators to spend more time handling the more active portions of their system-related work rather than performing the mundane tasks of maintenance.

A database management system automatic task generator may automatically perform maintenance tasks, among other tasks, by automatically detecting maintenance-related commands and relating those tasks to commands through the use of object metadata and policy rules.

In one embodiment, the invention is implemented in conjunction with a SQL database. The invention may be described in terms of its general applicability as well as in terms of the SQL environment embodiment. An example of the task command output is a Transact-SQL command set. The automatic task generator may use operations that are implemented by the database management system.

For example, the structured query language (SQL) is an American National Standards Institute (ANSI) standard used to communicate with a relational database. SQL is the standard language for relational database management systems. SQL statements are used to perform tasks such as update data or retrieve data from a relational database. Although many database systems use SQL, many of them also have their own additional proprietary extensions that are usually only used on their system. However, the standard SQL commands such as "Select", "Insert", "Update", "Delete", "Create", and "Drop" can be used to accomplish many things that one desires to do with a relational database. Additionally, such command statements may lead to the introduction of data structures within a database that require system maintenance. Therefore, it may be possible to utilize such commands as event triggers for the construction of tasks for maintenance or other required or desired system functions.

Figure 2:
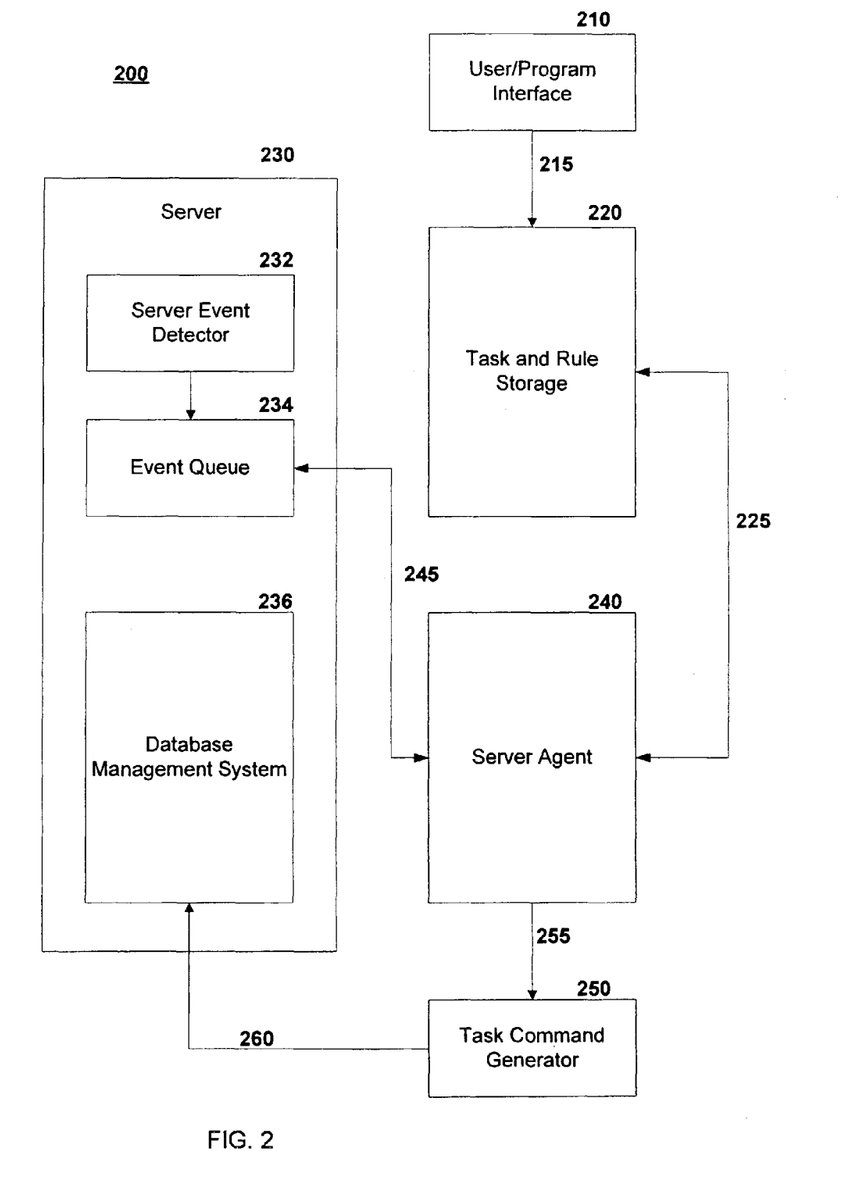
FIG. 2 depicts an exemplary block diagram in which aspects of the invention may be implemented.

FIG. 2 is a block diagram showing exemplary interconnections between elements of an exemplary automatic task generator 200. A user or program interface 210 allows either a user or a programmatic type interface to generate and enter 215 tasks into a storage area 220. The tasks may be a set of operations to be performed on specific database related objects. These tasks could be built from the ground up or derived from samples or templates.

Examples of such tasks are backup a file, defragment a hard disk, or rebuild a database. Tasks may be useful in the performance of maintenance on database systems or of operations related to objects while the system is being used. Examples of objects are a database, a table, a column, an index, a view, a trigger, a stored procedure, and a user program. An example of a task operating on an object may be to perform a full backup entitled "midnight backup" on a database daily starting at midnight.

Rules may be generated and entered via the user/program interface 210 and placed into the task and rule storage area 220. Rules may be generated that leverage the tasks in conjunction with database object metadata. Examples of object metadata for a database object are size, location, users, language, number of files, free space and custom attributes to name a few.

An example of a rule which uses this metadata is that if a database is created on the G drive and is larger than 100 MB and if the database has no backups relating to it then a new instance of the defined and stored task "midnight backup" is to be executed. The object metadata for this task is the drive letter G: the size of greater than 100 MB, and the fact that no backups exist.

The block diagram of FIG. 2 also includes a server 230 containing a database management system 236, such as a SQL relational database and its related management system and a separate program for the detection of server events 232 and an event queue 234. The database management system 236, such as SQL Server™, available via Microsoft Corporation in Redmond, Wash., is capable of full access to the underlying database (not shown). The server event detector 232 is able to detect events relevant to the operation of the database management system. For example, events referred to as data definition language (DDL) events, such as CREATE, ALTER and DROP commands may be detected by the server event detector 232. Additionally, other more generic events such as CREATE DATABASE commands may also trigger the server event detector 232 to respond. The server event detector 232 responds to these database related events by registering the event in an event queue 234. This queue allows the server to retain a record of the events that have occurred in response to the database management system 236 operations. The server event detector 232 also stores in the event queue 234 relevant metadata concerning the event detected. An example of a detected event and its related metadata is as follows:

| Event: | Database NEW created |
| --- | --- |
| Metadata: | time/date = 11:30 AM Nov. 01, 2003; |
| | Drive G; |
| | Size 200 MB; |
| | Collation Default |

A server agent 240, which may be running independently from the server 230, samples 245 the event queue in an effort to discover relevant database management system 236 activity. The event queue 234 responds to the server agent request for new event reformation by sending 245 a payload of information. The payload may contain an identification of the event as well as the metadata stored corresponding to the detected event. The payload information may be transferred 245 from the event queue 234 to the server agent 240 as an extensible markup language (XML) payload. This XML payload is easily identified and deciphered by the server agent because of the clearly tagged information contained therein.

The server agent 240, upon receipt of the XML payload, attempts to determine if the XML payload contains information that matches any of the rules previously stored. The server agent 240 thus reads 225 the task and rule storage 220 to access rules compatible with the present content of the XML payload. The comparison of the XML payload information and the recovered rules may be accomplished within the server agent 240.

In one embodiment, the server agent 240 may be a service that runs constantly and contains a series of dedicated threads. One of these threads is dedicated to listening to the event queue 234. Another thread is dedicated to the comparison of XML payload data and retrieved rule data.

In one embodiment, the access of the correct rule for comparison may be accomplished by using at least some of the data in the XML payload. For example, the XML payload may contain the identification of the operation occurring in the database management system as being CREATE DATABASE. In addition, the payload may include some relevant metadata. This operation identifier command and metadata may be used by the server agent to query the task and rule storage device to return all rules associated with the CREATE DATABASE command identifier. The returned rules from the task and rule storage device 220 are then compared in the server agent 240 using some or all of the XML payload information obtained from the event queue 234.

If there is no match, then the server agent takes no action relative to the XML payload. If there is a match with the XML payload and the information retrieved from the task and rule storage module 220, then the server agent accesses the tasks associated with the rules which were matched and accesses 255 a task command generator 250 which assembles those tasks. The command generator 250 may produce commands which can be entered 260 into the database management system 236.

In an example flow, if the server agent 240 accessed the event queue 236 to discover an XML payload that contained an event of CREATE DATABASE had occurred within a SQL Server™, it would compare that command with command rules from the task and storage module 220. If the command and accompanying metadata from the XML payload corresponded to a stored rule, then the server agent would access the task data associated with the rule data in the storage module 220. The task data may indicate that a "midnight backup" task should be invoked. The task command generator 250 would assemble the task, place the appropriate constraints on the task as to what command, what parameters and when to execute the task and then deliver 260 the task to the SQL Server™ database management system 236 as a Transact-SQL command for system maintenance.

There may be many embodiments of the invention as it relates to the location of the various elements of FIG. 2. For example, in one embodiment, the server queue 234 may be embodied inside SQL Server™ program code manifested as a database table wherein entries in the server queue become rows in the table.

In another embodiment, the server agent 240 may be a program running on the server 230 as opposed to on a separate computer. In yet another embodiment, the task generator 250 may be a function located inside the server agent 240. The functional structure of FIG. 2 is not a barrier to implementation combinations of the invention.

In another embodiment, the invention may generate task commands that are directed towards hardware or software commands that may or may not be a part of a database management system (not shown in FIG. 2). Although the event generated may be a result of a database management system event such as a create, delete, or update of an object within the database, the task commands generated by the event may include acts seemingly unrelated to the triggering database event. For example, a database event, such as an object create, may occur that triggers examination of metadata indicating that a disk drive is full. As a result, an immediate backup of the database may be desired. The invention may generate a command which activates a hardware or software command that may call a third party hardware or software module to assist with the backup function. The command generated may be executed outside of the database management system and be seemingly unrelated to the database management function. However, the command actually serves database management function use by making available more system resources for the database function.

Figure 3:
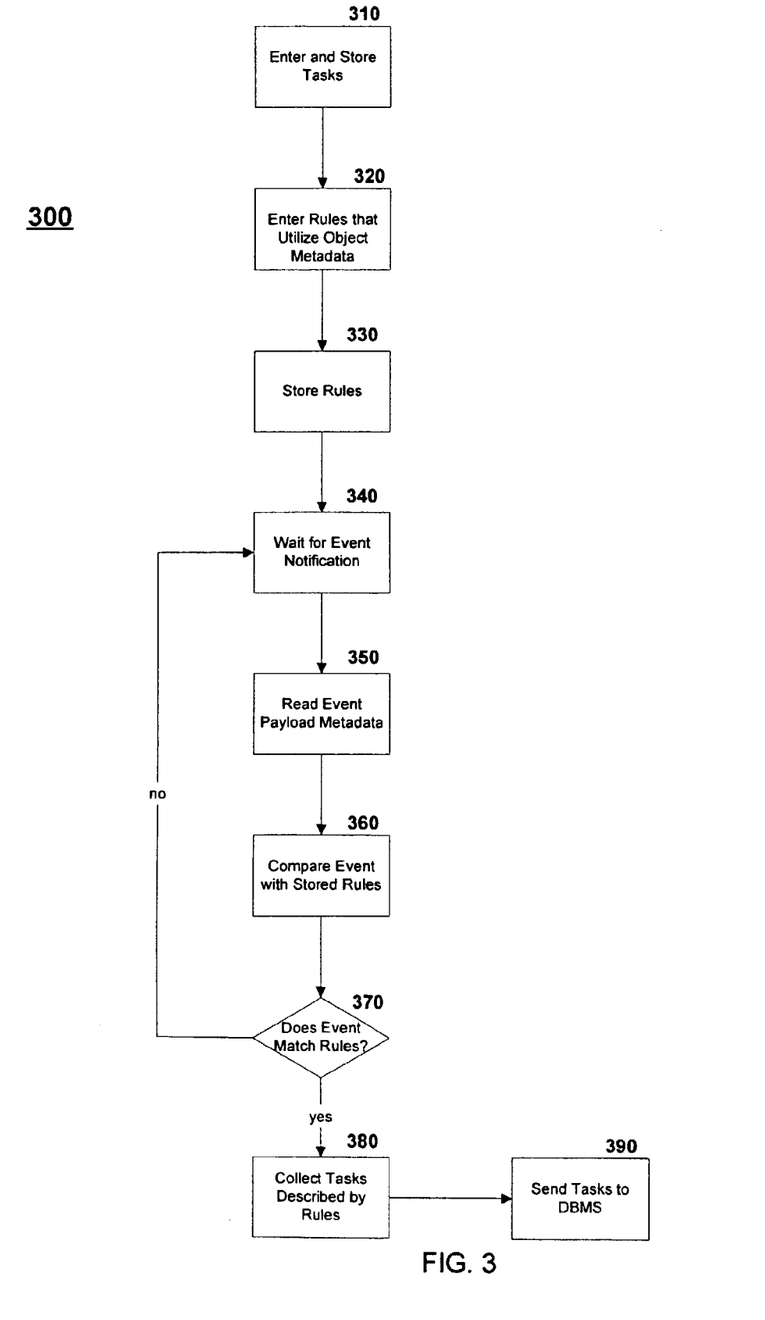
FIG. 3 illustrates an exemplary flow diagram applicable to an embodiment of the invention.
Figure 4:
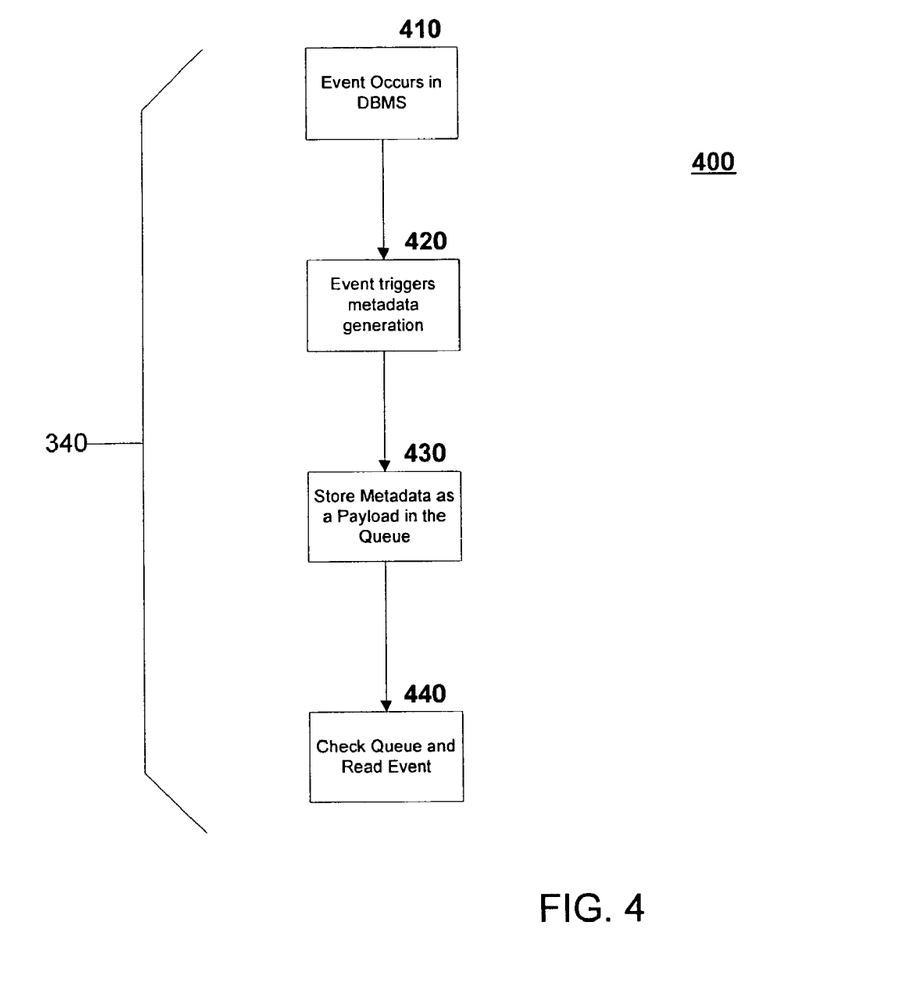
FIG. 4 illustrates an exemplary flow diagram applicable to an embodiment of an aspect of the invention.

FIG. 3 is a flow diagram of an exemplary method of an exemplary embodiment of the invention. The task generation process 300 may be setup by allowing an input for the definition and storing of tasks 310 that may occur in the operation of a database management system. Such tasks may be utilized as maintenance tasks or as other active tasks which may be desired to be performed with a database management system. The tasks may be built from the ground up or may be derived from samples or templates.

The process 300 continues setup by accepting an input of rules 320 which leverage upon the tasks earlier defined. Such rules also accommodate the use of object metadata to define the requirements for the utilization of the earlier defined rules. The rules are thereafter stored 330 such that both tasks and rules are available for subsequent use. It is noted that the tasks and rules stored in this procedure can be generated at any time prior to the need for accessing such items and there is no need to generate such tasks and rules immediately prior to their use.

The process of automatic task generation 300 continues by awaiting for a database management system event 340 such as a creation or change of a database object. When such an event occurs, the event is logged along with relevant metadata. The event occurrence of the event triggers the next steps which are to read the event payload (metadata) 350 and compare the payload and event 360 with the rules earlier generated and stored. If there is not a match 370, then the process returns to await the next notification of an event 340. If there is a match 370 between the event detected and the stored rules, then the tasks that are associated with the matched rules are collected and organized 380. Typically, the tasks may then be sent 390 to the database management system for subsequent execution.

The process of automatic task generation 300 continues by awaiting a database management system event 340 such as a creation or change of a database object. When such an event occurs, the event is logged along with relevant metadata. The occurrence of the event triggers the next steps which are to read the event payload (metadata) 350 and compare the payload and event 360 with the rules earlier generated and stored. If there is not a match 370, then the process returns to await the next notification of an event 340. If there is a match 370 between the event detected and the stored rules, then the tasks that are associated with the matched rules are collected and organized 380. Typically, the tasks may then be sent 390 to the database management system for subsequent execution.

As mentioned above, while exemplary embodiments of the invention have been described in connection with various computing devices and network architectures, the underlying concepts may be applied to any computing device or system in which it is desirable to implement an automated task generator. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the discussed invention. Additionally, any storage techniques used in connection with the invention may invariably be a combination of hardware and software While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the invention should not be limited to any single embodiment, but rather should be construed in breadth and scope in accordance with the appended claims.

What is claimed:

1. A computer-implemented method for automatically generating maintenance tasks for a SQL database management system, the method automatically performed by a computer, the method comprising:
    detecting an event that operates on the database management system, the event associated with one or more pre-determined rules comprising user-defined policies based on a database system environment and installation, wherein each of the pre-determined rules utilize database object metadata and is associated with stored tasks;
    registering the event in an event queue;
    storing metadata associated with the event in the event queue, wherein the metadata is generated in response to the occurrence of the event and an identification of the event and the associated metadata are stored as an XML payload in the event queue;
    requesting, by a server agent, the event and the associated metadata from the event queue, wherein the server agent is constantly monitoring the event queue;
    sending the event and the associated metadata to the server agent, from the event queue;
    retrieving all pre-determined rules associated with the event from a set of stored pre-determined rules;
    comparing the event and associated metadata with the retrieved pre-determined rules to detect a correspondence between the event and the associated metadata and one or more of the retrieved pre-determined rules;
    when the correspondence is detected, automatically generating an automatic maintenance task by automatically assembling the automatic maintenance task from the stored tasks associated with the one or more retrieved pre-determined rules having a correspondence with the event and the associated metadata and automatically placing appropriate constraints on the automatic maintenance task; and automatically delivering the stored tasks comprising the automatic maintenance task to the SQL database management system as commands for execution, wherein the automatic maintenance task is not generated when the correspondence is not detected.

2. The method of claim 1, further comprising defining automatic maintenance tasks using at least one of a user interface and a programmatic interface.

3. The method of claim 1, wherein the database object metadata comprises one or more of size, location, users, language, number of files, free space, and custom attributes.

4. The method of claim 1, wherein the stored tasks associated with the one or more retrieved pre-determined rules comprise at least one database management system command that corresponds to at least one automatic maintenance task.

5. The method of claim 1, wherein the stored tasks associated with the one or more retrieved pre-determined rules comprise at least one of a hardware command and a software command directed towards at least one of a database management function and a non-database management function.

6. A system for automatically generating maintenance tasks for a database management system, the system comprising:

a storage device providing means for storing a set of pre-determined rules and system tasks for operation on database objects, wherein each of the pre-determined rules utilize database object metadata and is associated with stored tasks, the pre-determined rules comprising user-defined policies based on a database system environment and installation;

means for automatically detecting an event that operates on the database management system and registering the event with associated metadata in an event queue, wherein the means for automatically detecting the event is constantly monitoring the event queue, wherein the metadata is generated in response to the occurrence of the event, and wherein an identification of the event and the associated metadata is stored as an XML payload in the event queue;

means for retrieving all pre-determined rules corresponding to the event from the set of stored pre-determined rules; and processing means for generating the maintenance tasks that includes:

means for comparing the event and associated metadata with the retrieved pre-determined rules to detect a correspondence between the event and the associated metadata and one or more of the retrieved pre-determined rules, means for automatically generating a maintenance task by automatically assembling the automatic maintenance task from the stored tasks associated with the one or more retrieved pre-determined rules having a correspondence with the event and the associated metadata when the correspondence is detected, and means for automatically placing appropriate constraints on the maintenance task; and means for automatically delivering the stored tasks comprising the automatic maintenance task to the SQL database management system as commands for execution, wherein the maintenance task is not generated when the correspondence is not detected.

7. The system of claim 6, further comprising means for providing an input for the rules and the system tasks.

8. The system of claim 6, wherein the stored tasks associated with the one or more retrieved pre-determined rules comprise at least one of a database management system command and a non-database system command.

9. The system of claim 6, wherein the database management system is a SQL based database management system.

10. The system of claim 6, wherein the stored tasks associated with the one or more retrieved pre-determined rules tasks are Transact-SQL commands for directing operations on a SQL database.

11. The system of claim 6, wherein the specific tasks comprise activating at least one of a hardware function and a software function.

12. A computer-readable storage medium, storing computer-executable instructions, for performing a method comprising:

automatically detecting an event that operates on the database management system, the event associated with one or more pre-determined rules comprising user-defined policies based on a database system environment and installation;

registering the event in an event queue;

storing metadata associated with the event in the event queue, wherein the metadata is generated in response to the occurrence of the event and an identification of the event and the associated metadata are stored as an XML payload in the event queue;

retrieving all pre-determined rules corresponding to the event from a set of stored pre-determined rules, wherein each of the pre-determined rules utilize database object metadata and is associated with stored tasks;

responding, by the event queue, to a request by a server agent by sending the event and the associated metadata to the server agent, wherein the server agent is constantly monitoring the event queue;

comparing the event and associated metadata with the retrieved pre-determined rules to detect a correspondence between the event and the associated metadata and one or more of the retrieved pre-determined rules;

when the correspondence is detected, automatically generating an automatic maintenance task by automatically assembling the automatic maintenance task from the stored tasks associated with the one or more retrieved pre-determined rules having a correspondence with the event and the associated metadata and automatically placing appropriate constraints on the automatic maintenance task; and automatically delivering the stored tasks comprising the automatic maintenance task to the SQL database management system as commands for execution, wherein the automatic maintenance task is not generated when the correspondence is not detected.

13. The computer-readable storage medium of claim 12, wherein the database object metadata comprises one or more of size, location, users, language, number of files, free space, and custom attributes.

14. The computer-readable storage medium of claim 12, wherein the stored tasks associated with the one or more retrieved pre-determined rules comprise at least one of a database management system command and a non-database management system command.

15. The computer-readable storage medium of claim 12, wherein the database management system is a SQL-based database management system.

16. The computer-readable storage medium of claim 12, wherein the stored tasks associated with the one or more retrieved pre-determined rules are Transact-SQL commands for directing maintenance operations on a SQL database.

17. A system for automatically generating maintenance tasks for a database management system, the system comprising:
- a computer comprising a database management system;
- an interface to receive and store at least one system maintenance task and at least one pre-determined rule related to the at least one system maintenance task wherein each of the at least one pre-determined rules utilize database object metadata and is associated with stored tasks, the pre-determined rules comprising user-defined policies based on a database system environment and installation;
- a memory to store the at least one system maintenance task and the at least one pre-determined rule;
- an event detector to detect a database event, wherein metadata is generated in response to the occurrence of the database event;
- an event queue to register a database event indictor and the related metadata, wherein the event indicator corresponds to the database event;
- a server agent to sense a registration of the database event indicator by requesting and receiving all pre-determined rules associated with the event from the stored at least one pre-determined rule, and an XML payload from the event queue, wherein the server agent is constantly monitoring the event queue, the XML payload comprising event information and the related metadata, the server agent comparing contents of the XML payload with the received pre-determined rules to detect a correspondence between the event and the associated metadata and one or more of the retrieved pre-determined rules, determining that an automatic maintenance task is required based upon the correspondence, and automatically generating the automatic maintenance task by automatically assembling the automatic maintenance task from the stored tasks associated with the one or more retrieved pre-determined rules having a correspondence with the event and the associated metadata and automatically placing appropriate constraints on the automatic maintenance task; and
- a task generator to produce commands based on the stored tasks comprising the automatic maintenance task.

18. The system of claim 17, wherein the database management system is a SQL database management system.

19. The system of claim 17, wherein the commands are Transact-SQL commands directed towards maintenance operation execution within the database management system.

20. The system of claim 17, wherein the commands comprise at least one of a hardware command and a software command directed towards at least one of a database management function and a non-database management function.

* * * * *